United States Patent [19]
Luciani et al.

[11] Patent Number: 5,739,224
[45] Date of Patent: Apr. 14, 1998

[54] SUPPORTED CATALYST FOR OLEFIN POLYMERIZATION

[75] Inventors: Luciano Luciani, Ferrara, Italy; Wolfgang Neissl, Lichtenberg; Birgit Wenidoppler, Gallspach, both of Austria

[73] Assignee: PCD Polymere Gesellschaft m.b.H., Austria

[21] Appl. No.: 745,264

[22] Filed: Nov. 8, 1996

[30] Foreign Application Priority Data

Nov. 8, 1995 [EP] European Pat. Off. ............. 95117550

[51] Int. Cl.$^6$ ..................... C08F 4/654; C08F 4/656; C08F 10/06
[52] U.S. Cl. ............. 526/124.5; 502/104; 502/110; 502/120; 526/124.6; 526/124.8; 526/351
[58] Field of Search ................... 502/104, 110, 502/120; 526/124.5, 124.6

[56] References Cited

U.S. PATENT DOCUMENTS

| | | |
|---|---|---|
| 4,226,741 | 10/1980 | Luciani et al. . |
| 4,329,252 | 5/1982 | Gavens et al. ............... 526/129 |
| 4,673,661 | 6/1987 | Löfgren et al. . |
| 4,727,049 | 2/1988 | Furuhashi et al. ............ 526/129 |
| 5,006,620 | 4/1991 | Zolk et al. . |
| 5,177,043 | 1/1993 | Koyama et al. .............. 826/124.6 |
| 5,244,854 | 9/1993 | Noristi et al. ............... 526/124.6 |
| 5,310,716 | 5/1994 | Luciani et al. . |
| 5,413,979 | 5/1995 | Kostiainen et al. ........... 526/124.6 |

FOREIGN PATENT DOCUMENTS

| | | |
|---|---|---|
| 193280 | 9/1986 | European Pat. Off. . |
| 0 368577 | 5/1990 | European Pat. Off. . |
| 0 474 249 | 3/1992 | European Pat. Off. . |
| 0 494 084 | 7/1992 | European Pat. Off. . |
| 0 595 574 | 5/1994 | European Pat. Off. . |
| 1387890 | 3/1975 | United Kingdom . |

*Primary Examiner*—Edward J. Smith
*Attorney, Agent, or Firm*—Wenderoth, Lind & Ponack

[57] ABSTRACT

Procedure for the preparation of a solid catalyst component which is active in the polymerization of olefins, comprising the steps:

a) contacting a silylated silica support with a solution of Mg-halide or Mg-alkyl-halide or a mixture of both, b) contacting the catalyst-precursor obtained in (a) with Mg-alkyl or Mg-alkyl-halide or a mixture of both, optionally in presence of electron-donors (Lewis bases), c) halogenating the catalyst-precursor obtained in (b) by contact of said activated support with halogenating agents, d) titanating the catalyst-precursor obtained in (c) with Ti-tetrahalide in the presence of electron-donors, e) recovering the solid catalyst-component from the reaction products of step (d).

The catalyst component, which is obtained according to the above procedure, may also be used together with Al-trialkyl or Al-alkyl-halides and a Lewis base, as a catalyst for the polymerization of olefins.

12 Claims, No Drawings

SUPPORTED CATALYST FOR OLEFIN POLYMERIZATION

The present invention relates to a procedure for producing a solid catalyst component for polymerizing α-olefins alone or in mixture.

α-Olefins such as propylene and higher olefine monomers be polymerized using Ziegler-Natta-catalysts based on an organometallic compound of elements of groups IA to IIIA and a compound of a transition metal belonging to groups IVA to VIA of the periodic table. Definition on Ziegler-Natta-catalyst can be found in literature, e. g. in the book: Boor Jr, Ziegler-Natta-catalysts and Polymerisation, Academic Press, New York, 1979. Highly active and highly sterospecific catalysts in the polymerisation of α-olefins, particularly propylene, are described in many patents, e. g. in British Pat. 1,387,890, where the use of (partially complexed with an electron donor compound) and the product obtained by grinding a mixture of a Mg-dihalide, an electron donor compound and halogenated Ti-compound are provided.

More recently other patents like U.S. Pat. Nos. 4,226,741 and 4,673,661 show new ways for improving the performance and the preparation of the catalyst of the above mentioned patent. In U.S. Pat. No. 5,310,716, the utilisation of inorganic carriers as supports (besides the use of Mg-dihalide) has been proposed.

In U.S. Pat. No. 5,006,620 (among others), the use of inorganic carriers (supports) in presence of Mg-alkyls has been described. According to this patent, a catalyst-component for the polymerisation of olefins is obtained by treating a silica in suspension with an organic Mg-compound, a gaseous agent selected from chlorine and hydrochloric acid, a derivative of phthalic a $C_{1-8}$ alkanol and Ti-tetrachloride.

Other proposals have been made in the art for improving the perfomance of catalytic systems. These proposals include modifications of the components of the catalytic systems by introducing further chemicals, e.g. typically Lewis bases, and using salts of a transition metal, in presence of a halide of bivalent metal like Mg-dichloride, alone or additionally in presence of organic or inorganic carriers.

Many companies are working to improve the performance of solid catalyst components with the aim to achieve a better stereoregular structure of the poly-alpha-olefins and correspondingly to increase the crystallinity and the stiffness. Patents have been issued dealing with changes in the catalyst composition and applying a pre-polymerization in well defined conditions, or using special Lewis bases, or using non-supported catalysts, like e.g. in EP-A-368,577.

In the field of catalyst research it is still strongly desirable to find new catalyst components or catalyst systems with improved performance, especially with high activity and/or high stereoregularity.

Polypropylene resins available on the market show usually a content of xylene extractables of about 2.5%. With these commodity polymers applications can be covered; but it would be possible to enhance some properties, like e.g. flexural modulus, thereby enhancing the application field and entering special niches of the market, when values of xylene extractables of around or below 2.0% could be achieved.

According to the present invention, it has now been found a particularly treated silica can interact in two steps with Mg-halide and an organic Mg-alkyl compound and chlorinated hydrocarbons. It has also been found that the precursor, obtained as mentioned above and containing silica and Mg-halide or Mg-alkyl-halide can interact with Ti-tetrahalide and with a Lewis base to give a solid catalyst-component which is highly active in the polymerisation of olefins to stereoregular polymers.

The present invention accordingly provides a process for the preparation of a solid catalyst component which is active in the polymerization of olefins, comprising the steps:

a) contacting a silylated silica support with a solution of M-halide or Mg-alkyl-halide or a mixture of both, b) contacting the catalyst-precursor obtained in (a) with M-alkyl or Mg-alkyl-halide or a mixture of both, optionally in presence of electron-donors (Lewis bases), c) halogenating the catalyst-precursor obtained in (b) by contact of said activated support with halogenating agents, d) titanating the catalyst-precursor obtained in (c) with Ti-tetrahalide in the presence of electron-donors, e) recovering the solid catalyst-component from the reaction of step (d).

According to the present invention (concerning the preparation of an active solid component of a catalytic system, containing a silica carrier, catalytic active part based on magnesium, halogen, titanium and Lewis bases an particularly qualified for polymerizing α-olefins alone or in mixture, especially propylene into stereoregular polymers) the procedure will preferably comprise:

1. A thermal treatment of a non activated silica to eliminate totally or partially hydroxyl groups and a chemical treatment with silylation reagents to replace active hydrogen in the compound by substituted silane groups.

2. Contacting of said silica with a solution of Mg-dihalide, an organic solvent, operating with a weight ratio between the Mg-compound and silica of for instance 0.02 m to 10 g, at a temperature ranging from 15° C. to the boiling point of the diluent, for the time necessary first to solubilize the solid salts of Mg and then to deposit these compounds into the silica.

3. Contacting of the above composition, after removal of the diluent via distillation, with a solution in an inert hydrocarbon solvent of a Mg-dialkyl or Mg-halide-alkyl, operating with a weight ratio between Mg and silica of for instance 60 mM to 10 g, at a temperature from 15° C. to the boiling point of the liquid phase for a period necessary to let deposit totally or partially the Magnesium compound on the silica. In this step, an amount of Lewis bases (electron donor) preferably added to the hydrocarbon in a weight ratio between Lewis bases silica for instance of 8.5 mM to 10 g.

4. Halogenation of the above composition by a treatment with halogenating agents especially selected e. g. from hydrocarbon halides, and operating in excess of this diluent at a temperature of −20° C. to 120° C. and for a period of 0.25 to 10 hours.

5. Treatment of the above obtained composition with an excess of Ti-tetrahalide either alone or in solution with hydrocarbon halides in presence of a Lewis base in a weight ratio between silica and Lewis base of e.g. 10 g to 8.5 mM. The titanation of the precursor, halogenated as above described, is carried out preferably at temperatures from 80° C. to 130° C. for a period of 0.25 to 10 hours.

6. Recovery of the above obtained solid catalytic system after washing with hydrocarbon diluent and drying.

The first step of the preparation is dealing with silica treatments. The silica suitable as a carrier, is preferably microspheroidal and porous, with a particle size of 15 to 150 μm, with a surface area of 100 to 500 m²/g, a pore volume of 1.2 to 3.0 ml/g and an average pore diameter of 20 to 500 Å.

The silica has been thermically pretreated e.g. at 725° C. for 8 hours reducing the content of hydroxyl groups from about 5 mM/g to about 0.5 mM/g and then treated with silylation reagents like e.g. hexamethyldisilane (HMS), trimethylchlorosilane (TMCS), hexamethyldisilazane (HMDS) or other silyldonor reagents. The silylation of silica is described e.g. in "Silicon Compounds, Register and Review, Petrarch System Silanes-Silicones", 1987 (Bartram RD Bristol, Pa. 19007) or in Ullmann's Encyclopedia of Industrial Chemistry, Vol. A 23, 5$^{th}$ed. 1993. The content of hydroxyl groups in the silica after these treatments is preferably lower than 0.2 mM/g.

In the second step of the procedure according to the present invention, the silica, as treated above, is suspended in a solution of Mg-compounds in a solvent e.g. ethylacetate.

The Mg-compounds suitable for this purpose are those defined by the formulae $MgX_2$ or $MgXR_1$, where X represents a halogen atom, preferably chlorine, and $R_1$ an alkyl group, linear or branched, containing from 1 to 10 carbon atoms. Specific examples are Mg-dichloride, Mg-ethyl-, or -propyl-, or -butyl-, or -hexyl-chloride.

Specific solvents for the above mentioned Mg-salts are esters, like ethylacetate, ethylformiate; ketones, like acetone; alcohol, like ethylalcohol, butylalcohol, hexylalcohol, benzylalcohol, trichloroethylalcohol; amides, like acetamide, dimethylformamide, dimethylacetamide; organic acids, like benzoic acid, versatic acid, pelargonic acid, nonanoic acid. Preferably in this invention ethylacetate has been used.

The solution of Mg-halide, preferably Mg-dichloride, is obtained at a temperature ranging from 15° C. to the boiling point of the liquid phase, preferably from 50° C. to refluxing temperature for a period of 0.5 to 4.0 hours, preferably of 2 to 3 hours. In a preferred embodiment, Mg-dihalide or Mg-alkyl-halide is dissolved in ethylacetate.

The silica support, treated as above mentioned is preferably added to the solution of Magnesium-salts permitting the deposition into the silica support in a time from 0.15 hours to 2.0 hours, preferably 0.5 hours to 1.0 hour at a temperature of 40° C. to reflux temperature, preferably around or higher than 75° C. Under the above conditions the Magnesium-salts are totally or partially absorbed into the silica. The amount of Mg-dichloride used according to the present invention is of 10 to 30% w. referred to the silica, preferably of 15 to 25%·w. and of 1 to 3 g referred to 100 ml of ethylacetate, preferably from 1.5 to 2.5. To complete this step, the liquid phase is removed by distillation, the solid matter washed with n-heptane and then with n-pentane, and finally dried.

In the third step, the precursor, obtained as above described, is added to a solution of a Mg-dialkyl or Mg-halogen-alkyl, preferably Mg-dihexyl diluted in n-heptane at 20% w. The Mg-dialkyl added to the total amount of precursor is of 30 to 90 mM referred to 10 g of silica, preferably of 50 to 70 mM.

Additionally, a donor was introduced into the solution, preferably diisobutylphthalate in an amount of 1.0 to 5.0 ml. The resulting suspension is kept at a temperature ranging from 20° to 60° C., preferably from 30° C. to 50° C., for a period of about 0.5 to 1.0 hour.

In the fourth step of the procedure according to the present invention, the suspension heated as above described is put in contact and interacted with one or more halogenating agents selected from halogenated hydrocarbons, like n-butylchloride, chloroform, trichloroethane, dichloroethane, dichloromethane; or $SiCl_4$, $SnCl_4$, $Cl_2$, etc. Among these, a mixture of n-butylchloride and chloroform is preferred. The ratio between chloroform and n-butylchloride is optional, preferred is the value of about 2 to 1 in volume. The amount of halogenating agent can be of 1000 ml for an amount of 50 to 100 g of solid matter (precursor), preferably of 65 to 75 g. The time necessary for halogenating varies from 1 h to 3 h, preferably from 1.5 h to 2.5 h, the temperature from 40° C. to the boiling point of the diluent, preferably from 60° C. to reflux temperature. It is further preferred, to contact the catalyst precursor with, e.g., di-isobutyl-phthalate as a donor or Lewis base before the halogenating step. At the end of the halogenating treatment, the solid is separated from the suspension, for example by sedimentation and syphoning, filtration or centrifugation, and washed with a solvent, such as a liquid aliphatic hydrocarbon solvent, and dried.

In the fifth step of the procedure, according to the present invention, the halogenated precursor of the fourth step is submitted to titanation. Thereby it is preferred to submit the solid catalyst component obtained in step 4 to one or more treatments with Ti-tetrachloride, concentrated or diluted in aliphatic or aromatic hydrocarbons, in presence of a Lewis base.

More specifically, the procedure is carried out with an excess of Ti-tetrahalide, preferably of Ti-tetrachloride by suspending the precursor obtained as above mentioned. The operating temperature varies from 70° C. to 135° C., preferably from 90° C. to 120° C. for a period from 0.5 to 4.0 hours, preferably from 1 hour to 3 hours. According to the present invention a Lewis base, like diisobutylphathalte, is added to Ti-tetrahalide in a preferred amount of 2.0 to 3.0 ml referred to 10 g of Silica used for the preparation.

Lewis bases can be, e. g., esters, ethers, amines, alkoholates, amides, preferably diisobutylphthalate.

After removing the overnatant Ti-tetrahalide, the Ti-tetrahalide treatment is repeated preferably twice, and finally, before recovering the solid catalyst component, the precursor is submitted to treatments with a liquid aliphatic hydrocarbon to dissolve and remove traces of Ti-tetrahalide, and dried.

The invention further concerns a solid catalyst component for the polymerization of olefins, obtained by the reaction steps:

a) contacting a silylated silica support with a solution of Mg-halide or Mg-alkyl-halide or a mixture of both, b) contacting the catalyst-precursor obtained in (a) with Mg-alkyl or Mg-alkyl-halide or a mixture of both, optionally in the presence of electron-donors (Lewis bases), c) halogenating the catalyst-precursor obtained in (b) by contact of said activated support with halogenating agents, d) titanating the catalyst-precursor obtained in (c) with Ti-tetrahalide in the presence of an electron-donor compound, e) recovering the solid catalyst-component from the reaction products of step (d).

According to the present invention, the solid catalyst component shows preferably this composition:

| Silica support |    | 27–87.5% w. | esp. | 55–65% w. |
|---|---|---|---|---|
| Catalytic active part: | Mg | 2–10% w | esp. | 5.0–9.0% w. |
|  | Cl | 9–47% w | esp. | 24–28% w. |
|  | Ti | 1.0–6% w | esp. | 1.5–4% w. |
| Lewis base |    | 0.5–10% w | esp. | 1.0–6% w. | wherein the Titanium is almost completely in its tetravalent form.

The present invention relates moreover to a catalyst for the stereospecific polymerization of α-olefins, which contains: A—a solid catalyst-component as described above; B—Aluminiumtrialkyl or -haloalkyl, preferably Al-trialkyl or Al-chloroalkyl; C—an electron donor, preferably selected from alkoxy-silane derivatives.

The solid catalyst component or the catalyst as described above can be advantageously used in bulk, slurry or gas phase processes for the preparation of polyolefins by homopolymerization or copolymerization with two or more monomers. The catalyst can be used also in the polymerization of ethylene as it is or omitting internal and external donors.

The present invention further relates to a process for the preparation of polyolefins by homopolymerization or copolymerization of olefins, wherein a solid catalyst component or catalyst as described above is used. The polymerisation is conducted according to conventional methods, operating in a liquid phase, either in the presence or in the absence of an inert hydrocarbon diluent, or in gas phase.

The catalyst of the invention can be used also at higher temperatures, whereby the polymerization is preferably carried out at a temperature of about 20° to 150° C., more preferred between 70° C. and 120° C., at atmospheric pressure or at a higher pressure, in absence or in presence of hydrogen.

The catalyst of the present invention is highly active and highly selective, permitting to achieve very low values of extractable amorphous resins in boiling n-heptane and xylene. A content of xylene soluble resins of below 2% w can easily be achieved, values approaching 0.7% w can also be achieved.

Many other αα-olefins can also be polymerized using this catalyst, like butene-1, 4-methyl-1-penten, hexene-1, alone or in mixture with other αα-olefins for obtaining copolymers and terpolymers, mainly of rubber type.

The use of this catalyst permits moreover to obtain controlled polymer particle size of the desired dimension on the basis of the choice of the selected silica.

Moreover, the catalyst according to the invention shows an outstanding response to hydrogen, permitting to obtain high melt flow (MFI), and also to increase dramatically the yield.

Finally, this catalyst produces polypropylene resin at very high level of crystallinity due to the high selectivity and high stereoregularity.

EXAMPLE 1

10 g of microspheroidal silica, silylated grade, as described above and silylated with hexamethyldisilane (HMS), with a surface area of 225 $m^2/g$, pore volume of 1.22 ml/g, and particles diameter of 49 μm, are introduced into a flask containing a solution of 2.0 g of α-Mg-dichloride, in 150 ml of ethylacetate. The slurry is left to contact under stirring for 0.5 hours at the boiling point of the diluent. The solid is recovered by evaporating the solvent and washed twice with 200 ml of n-heptane and twice with 200 ml of n-pentane. The hydrocarbon diluents are removed and the precursor dried. 60 mM of Mg dihexyl diluted with n-heptane (20% V) and 2.4 ml of di-iso-butyl-phthalate are added to the solid matter, stirring for 45 minutes at 40° C. A solution of 100 ml of chloroform and 40 ml of n-butylchloride are introduced into the flask and reacted for 2 hours at 70° C., still under stirring, then the liquid is siphoned and the precursor washed and dried. 60 ml of Ti-tetrachloride are added at room temperature to the thus obtained solid, and the suspension is slowly heated to 90° C. When the temperature has reached the mentioned value, 2.3 ml of Diisobutylphthalate are added dropwise while increasing the temperature to 110° C. under stirring. After filtering at 110° C., the same treatment with Ti-tetrachloride without diisobutylphthalate is carried out twice. The liquid is finally syphoned at 110° C. and the solid matter washed 5 times with 200 ml of n-heptane at 85° C. for 0.5 hours each time. After twice washing treatment with n-pentane at room temperature, the catalyst is dried. 15.7 g of a grey solid component were obtained, containing 21.2% w of Cl, 4.2% w of Mg and 2.3% w of Ti. The activity and stereospecifity of this solid catalyst component were determined in runs of propylene polymerisation in liquid monomer, using as a cocatalyst Aluminiumtrialkyls treated with electron-donor compounds. An autoclave of 5 liters equipped with a magnetic stirrer was used. The polymerisation temperature was 85° C., the amount of propylene 2000 ml and the time two hours. Hydrogen (3500 ml) was present as molecular weight modifier. An amount of about 70 mg of solid catalyst component was charged into the autoclave using as a co-catalyst an amount of Al-triethyl corresponding to an Al/Ti molar ratio (m.r.) of 100 and an electron donor (D=dicyclopentyldimethoxysilan) corresponding to an Al/D m.r.=20. At the conclusion of the polymerisation, the remaining propylene was flashed out and the polymer was then dried in nitrogen atmosphere at about 70° C. A yield equal to 8.2 kg PP per gram of solid component of catalyst and to 358 kg PP per gram of Titanium was obtained with the following characteristics:

MFI (2.16 kg; 230° C. ASTM D1238 L)=0.60

Bulk density . . . g/ml=0.43

Isotactic index=98.9

Xylene soluble % w=1.19

EXAMPLE 2

A solid catalyst component was prepared following the procedure described in example 1.

After polymerizing at the same conditions as described in example 1 at an Al/D m.r.=10 with 10.000 ml of $H_2$, a yield of 11.3 kg PP/g of solid catalyst component and of 471 kg PP/g Titanium were obtained with the following characteristics:

MFI (2.16 kg; 230° C.-ASTM D 1238L)=5.04

Bulk density . . . g/ml=0.44

Isotactic index=98.7

Xylene soluble % w=0.71

We claim:

1. Procedure for the preparation of a solid catalyst component which is active in the polymerization of olefins, comprising the steps:

a) contacting a silylated silica support with a solution of Mg-halide or Mg-alkyl-halide or a mixture of both, b) contacting the catalyst-precursor obtained in (a) with Mg-dialkyl, optionally in presence of electron-donors (Lewis bases), c) halogenating the catalyst-precursor obtained in (b) by contact of said activated support with halogenating agents, d) titanating the catalyst-precursor obtained in (c) with Ti-tetrahalide in the presence of electron-donors.

e) recovering the solid catalyst-component from the reaction products of step (d).

2. Procedure according to claim 1, wherein in step (a) microspheroidal silylated silica is used with a particle size of 15 to 150 micron, a surface area of 100 to 500 $m^2/g$, a pore volume of 1.2 to 3.0 ml/g, containing a total amount of hydroxyl groups of lower than 0.2 mM/g.

3. Procedure according to claim 1, wherein in step (a) Mg-dihalide or Mg-alkyl-halide is dissolved in ethylacetate.

4. Procedure according to claim 1, wherein the halogenating agents are chosen from the group consisting of chlorinated hydrocarbons.

5. Procedure according to claim 1, wherein a mixture of chloroform and butylchloride is used as halogenating agent.

6. Procedure according to claim 1, wherein in step (b) the catalyst precursor is optionally contacted with diisobutylphthalate.

7. Procedure according to claim 1, wherein the solid catalyst-component obtained in step (c) is submitted to one or more treatments with Ti-tetrachloride, concentrated or diluted in aliphatic of aromatic hydrocarbons, in presence of a Lewis base.

8. A solid catalyst component for the polymerization of olefins, obtained by the reaction steps:

a) contacting a silylated silica support with a solution of Mg-halide or Mg-alkyl-halide or a mixture of both, b) contacting the catalyst-precursor obtained in (a) with Mg-dialkyl, optionally in presence of electron-donors (Lewis bases), c) halogenating the catalyst-precursor obtained in (b) by contact of said activated support with halogenating agents, d) titanating the catalyst-precursor obtained in (c) with Ti-tetrahalide in the presence of electron-donors, e) recovering the solid catalyst-component from the reaction products of step (d).

9. The solid catalyst-component according to claim 8, containing 27–87.5% w. silica, 2.0–10.0% w. Mg, 9–47% w. Cl, 1.0–6.0% w. Ti and 0.5–10.0% w. of a Lewis base.

10. Catalyst for the polymerization of olefins, which is based on a solid catalyst component as claimed in claim 8, an Al-tri-alkyl or an Al-halogen-alkyl and a Lewis base.

11. Catalyst for the polymerization of olefins as claimed in claim 10, wherein the Lewis base is an alkoxysilane derivative.

12. Process for the preparation of polyolefins by homopolymerization or copolymerization of olefins, wherein a solid catalyst component or catalyst as claimed in claim 10 is used.

* * * * *